(12) United States Patent
Smith

(10) Patent No.: US 12,150,444 B2
(45) Date of Patent: Nov. 26, 2024

(54) SPRAYER VEHICLE COMPRISING TELESCOPING PARALLEL LINKAGE AND RELATED METHODS

(71) Applicant: AGCO Corporation, Duluth, GA (US)

(72) Inventor: Evan Thomas Smith, Spirit Lake, IA (US)

(73) Assignee: AGCO Corporation, Duluth, GA (US)

( * ) Notice: Subject to any disclaimer, the term of this patent is extended or adjusted under 35 U.S.C. 154(b) by 798 days.

(21) Appl. No.: 17/138,589

(22) Filed: Dec. 30, 2020

(65) Prior Publication Data

US 2021/0195886 A1 Jul. 1, 2021

Related U.S. Application Data

(60) Provisional application No. 62/954,760, filed on Dec. 30, 2019.

(51) Int. Cl.
*A01M 7/00* (2006.01)
*A01C 23/00* (2006.01)

(52) U.S. Cl.
CPC ......... *A01M 7/0057* (2013.01); *A01C 23/008* (2013.01); *A01M 7/0085* (2013.01)

(58) Field of Classification Search
CPC .............. A01M 7/0053; A01M 7/0057; A01M 7/0085; A01C 23/008; A01B 59/062; A01B 59/066; A01B 61/04; A01B 63/002; A01B 63/004
See application file for complete search history.

(56) References Cited

U.S. PATENT DOCUMENTS

| | | | |
|---|---|---|---|
| 6,321,851 B1* | 11/2001 | Weiss | A01B 59/062 280/477 |
| 2002/0125018 A1 | 9/2002 | Bernhardt et al. | |
| 2005/0056438 A1 | 3/2005 | Nordhoff | |
| 2009/0084566 A1 | 4/2009 | Claas et al. | |
| 2014/0197297 A1* | 7/2014 | Ito | A01B 63/1006 248/550 |
| 2020/0029484 A1* | 1/2020 | Weidenbach | A01B 63/24 |
| 2020/0275645 A1* | 9/2020 | Smith | A01M 7/0057 |

FOREIGN PATENT DOCUMENTS

FR 2698517 A1 6/1994

OTHER PUBLICATIONS

UK Intellectual Property Office, Search Report for related UK Application No. GB2000213.5, dated Jul. 8, 2020.

* cited by examiner

*Primary Examiner* — Tuongminh N Pham

(57) ABSTRACT

A sprayer vehicle includes a mobile frame, a boom, and a boom-positioning mechanism. The boom is spaced from the frame. The boom-positioning mechanism is configured to support the boom on the frame for selective movement between a raised boom position and a lowered boom position. The boom-positioning mechanism includes a positioning actuator, and a telescoping parallel linkage providing constant spacing between the boom and the frame in the raised boom position and lowered boom position. The positioning actuator is configured to raise the boom to the raised boom position upon elongation and to lower the boom to the lowered boom position upon retraction. The agricultural sprayer may further include a controller for positioning the boom relative to the frame, an underlying surface, or another reference.

18 Claims, 10 Drawing Sheets

SPRAYER VEHICLE COMPRISING TELESCOPING PARALLEL LINKAGE AND RELATED METHODS

CROSS REFERENCE TO RELATED APPLICATION

This application claims the benefit of U.S. Provisional Patent Application No. 62/954,760, "Adjustable Length Parallel Linkage for Agricultural Sprayer Boom," filed Dec. 30, 2019, which is hereby incorporated by reference in its entirety.

FIELD

The present disclosure generally relates to sprayer vehicles, such as agricultural sprayer vehicles, and more specifically to boom-positioning mechanisms for sprayer vehicles.

BACKGROUND

Agricultural sprayer vehicles apply any of various spray materials to agricultural crops or other plants. The spray materials may be liquid or particulate, and may be fertilizers, pesticides, herbicides, or the like. The spray material is sprayed or otherwise distributed over the agricultural crops such that an even and expected distribution is achieved. The expected distribution is achieved by keeping the spray a certain distance above (or otherwise relative to) a height of the agricultural crops.

The boom of conventional sprayer vehicles is large and extends laterally far from the frame of the vehicle. As such, weight distribution between a front axle and a rear axle can cause serious problems if not managed closely. Existing agricultural sprayer vehicles use parallel linkages to raise and lower the boom to achieve the distance above the crops. However, these parallel linkages swing the boom outwardly (typically in a fore-and-aft direction) relative to the frame, which may cause the weight to be distributed farther from the frame than is desired.

This background discussion is intended to provide information related to the present invention which is not necessarily prior art.

BRIEF SUMMARY

Some embodiments include a boom-positioning mechanism for an agricultural sprayer that is configured to maintain a constant lateral spacing between a boom and a frame of the agricultural sprayer. This constant lateral spacing keeps the center-of-gravity for the agricultural sprayer substantially constant whether the boom is in a raised boom position or in a lowered boom position (or in any intermediate position). This provides greater stability for the agricultural sprayer as it performs the spraying tasks, and helps maintain more consistent and precise positioning of the boom relative to, for example, a crop canopy.

Embodiments are broadly directed to an agricultural sprayer having a mobile frame, a boom, and a boom-positioning mechanism. The boom is spaced from the frame. The boom-positioning mechanism is configured to support the boom on the frame for selective movement between a raised boom position and a lowered boom position. The boom-positioning mechanism includes a positioning actuator and a telescoping parallel linkage, which together provide constant spacing between the boom and the frame, whether the boom is in the raised boom position or the lowered boom position.

In some embodiments, the telescoping parallel linkage includes a left parallel linkage and a right parallel linkage, and the positioning actuator is between the left parallel linkage and the right parallel linkage. In other embodiments, the agricultural sprayer further includes a controller configured to selectively manipulate the positioning actuator and the telescoping parallel linkage, with the controller configured to shorten the telescoping parallel linkage upon elongating the positioning actuator to provide a constant spacing between the boom and the frame between the raised boom position and the lowered boom position. The positioning actuator may be configured to place the boom in the raised boom position upon elongation and in the lowered boom position upon retraction.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The figure described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals. The present embodiments are not limited to the precise arrangements and instrumentalities shown in the figures.

Figure 1:
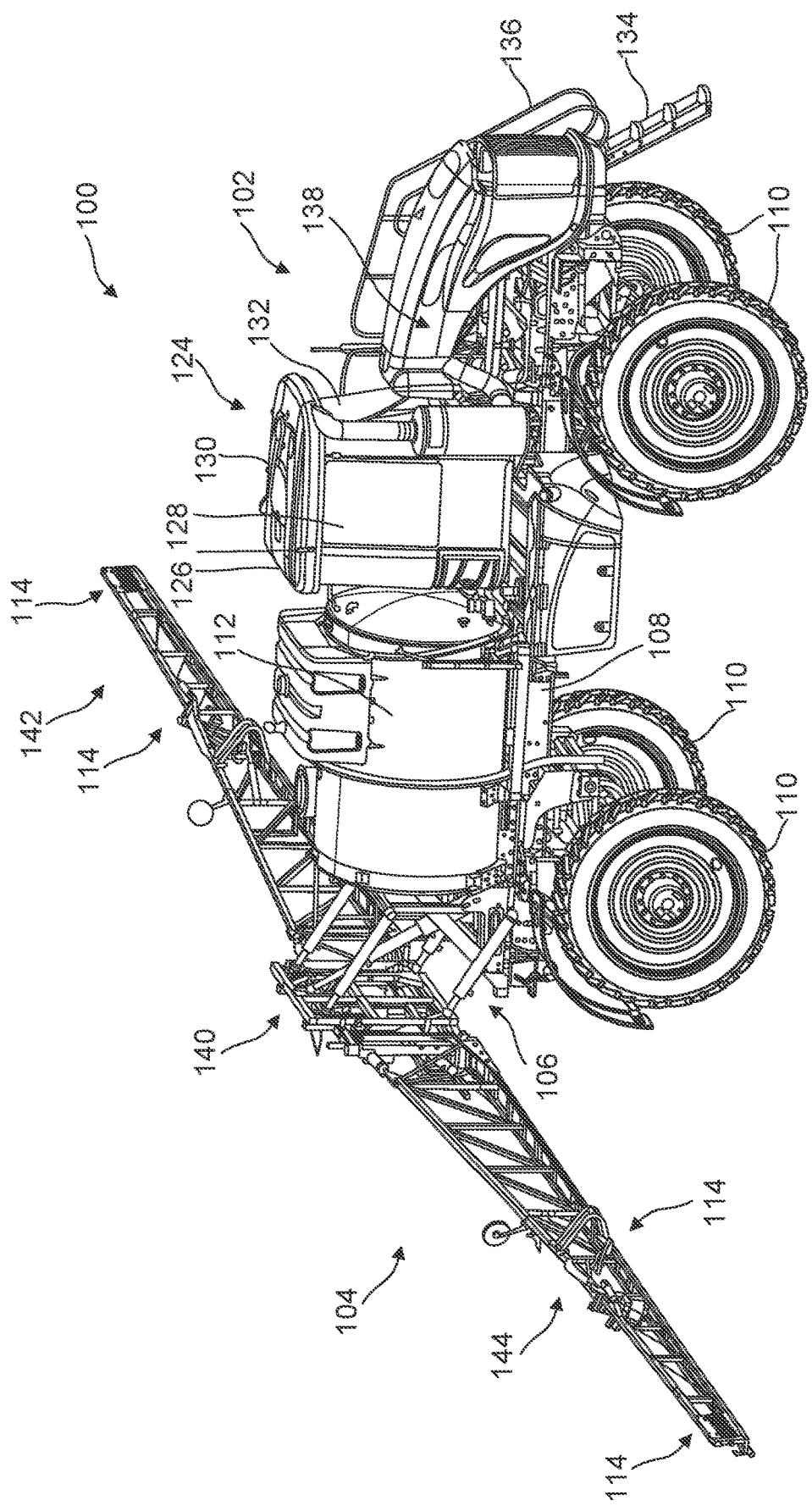
FIG. 1 is a perspective view of an agricultural sprayer having a boom in a raised boom position.

The figures depict exemplary embodiments for purposes of illustration only. One skilled in the art will readily recognize from the following discussion that alternative embodiments of the systems and methods illustrated herein may be employed without departing from the principles of the invention described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION

While the drawings illustrate, and the specification describes, certain embodiments of the disclosure, it is to be understood that such disclosure is by way of example only. There is no intent to limit the principles to the particular disclosed embodiments. For instance, the drawing figures do not limit to the specific embodiments disclosed and described herein. Furthermore, directional references (for example, top, bottom, up, and down) are used herein solely for the sake of convenience and should be understood only in relation to each other. For instance, a component might in practice be oriented such that faces referred to as "top" and "bottom" are sideways, angled or inverted relative to the chosen frame of reference.

Exemplary Agricultural Sprayer

FIG. 1 depicts an agricultural sprayer 100. As discussed above, agricultural sprayers 100 are used to provide a spray material to a set of crops or other plants within a field. The agricultural sprayer 100 broadly includes a mobile frame 102, a boom 104, and a boom-positioning mechanism 106. The boom-positioning mechanism 106 sets the boom 104 at a certain vertical distance or height relative to the mobile frame 102 and/or an underlying surface. Control of the boom 104 at the set height allows for even and predictable application of the spray material by the sprayer vehicle 100.

Generally, the mobile frame 102 includes a chassis 108 and wheels 110. The wheels 110 are rotatably secured to the chassis 108 such that the mobile frame 102 may move (under its own or an external power, as discussed below). The chassis 108 supports various other components discussed herein, such as the boom-positioning mechanism 106 and the boom 104. Embodiments discussed herein may keep the weight distribution of these various components substantially constant on the wheels 110 and the chassis 108.

The mobile frame 102 may also include a tank 112 for storage of the spray material (which may be a liquid or a particulate). The tank 112 is fluidly connected to one or more spray mechanisms 114 (e.g., nozzles) on the boom 104. The spray material may be pulled or pushed out of the tank 112 toward the spray mechanisms 114, which apply the spray material to the crops proximate to the spray mechanism 114. In some embodiments, the tank 112 includes a fill opening 116 and a discharge opening 118 (best shown in FIGS. 5-6). The fill opening 116 is configured to receive spray material into the tank 112. The discharge opening 118 is located near a bottom side of the tank 112 and is configured to discharge excess or unused spray material. The tank 112 may be held to the chassis 108 via one or more retention straps 120 secured to tank mounts 122 (best shown in FIGS. 5-6).

Figure 2:
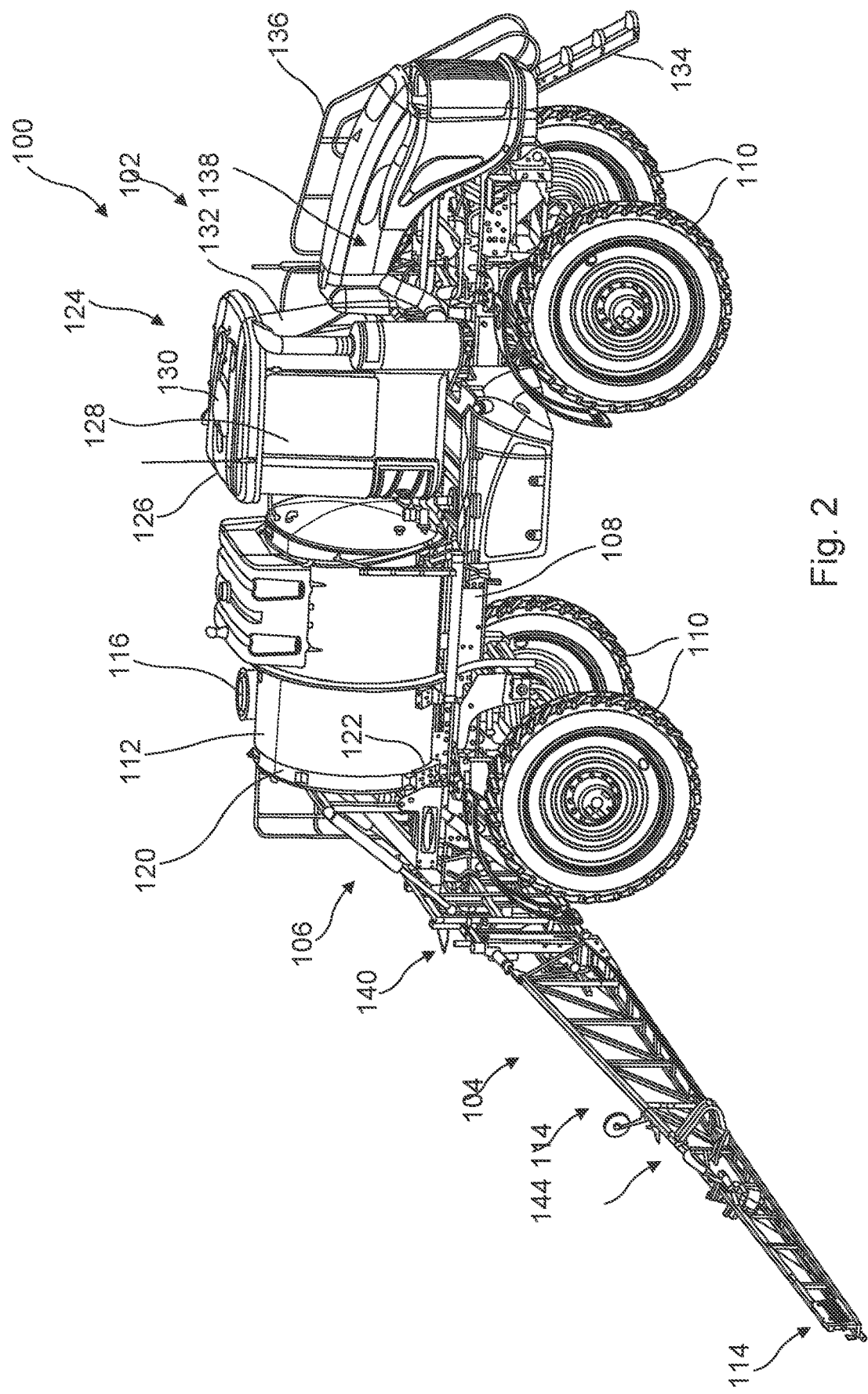
FIG. 2 is a perspective view of the agricultural of FIG. 1, but showing the boom in a lowered boom position.

In some embodiments, the agricultural sprayer 100 is manned and self-propelled, such as illustrated in FIGS. 1 and 2. In these embodiments, the mobile frame 102 is part of a tractor 124, vehicle, or other machine. The mobile frame 102 is configured to support a driver thereon for operation of the tractor 124. The tractor 124 preferably includes a cab 126 or other seat for the driver. The cab 126 is supported on the chassis 108 of the mobile frame 102 and configured to support the driver. In some embodiments, such as those illustrated, the cab 126 may include walls 128, a roof 130, and a windshield 132. The mobile frame 102 may further include a ladder 134 to allow the driver to easily access the cab, which may include a handrail 136.

In some embodiments, a motor 138 is supported on the mobile frame 102 and configured to propel the mobile frame 102. Examples of a motor 138 may include an internal combustion engine, a hybrid engine, an electric motor, or other power generator. The motor 138 drives one or more of the wheels 110 to impart a rotation thereof, which propels the mobile frame 102. The mobile frame 102 moves such that the spray material may be spread evenly over a large area.

In other embodiments, the agricultural sprayer is unmanned and self-propelled. In these embodiments, the agricultural sprayer may include the above-discussed motor without the above-discussed cab. The agricultural sprayer of this embodiment may be remotely driven or driven via artificial intelligence.

In other embodiments, not illustrated, the agricultural sprayer is externally propelled. In these embodiments, the mobile frame is a trailer configured to be pulled by a tractor or other machine. The trailer may be a more cost-effective option because the driver can pull the trailer with a standard tractor, without having a separate tractor specifically for spraying. Such a sprayer vehicle may include a chassis, wheels, a tank, a boom-positioning mechanism, and a boom.

The boom 104 is configured to be deployed in a substantially horizontal-lateral configuration and stowed in a substantially horizontal-axial configuration. In the deployed horizontal-lateral configuration, as shown in FIGS. 1-4, the boom 104 extends laterally outward from respective sides of the mobile frame 102. This allows the boom 104 to be spread over a wide area for the application of the spray materials. In the horizontal-axial configuration, not illustrated, the boom 104 is substantially aligned with a direction of travel of the mobile frame 102. This allows the boom 104 to be stowed to maximize ease of travel and to store the boom 104 between operations.

As illustrated in FIGS. 1 and 2, the boom 104 includes a central segment 140, a left segment 142, and a right segment 144 ("left" and "right" as used herein from a perspective of an observer behind the sprayer vehicle 100 viewing the rear of the sprayer vehicle 100). The left segment 142 and the right segment 144 are each independently movable relative to the central segment 140. Thus, the boom 104 is in the deployed orientation when the left segment 142 and the right segment 144 are both in an extended orientation (e.g., perpendicular to the direction of travel, as shown in FIGS. 1 and 2), and the boom 104 is in the stowed configuration when the left segment 142 and the right segment 144 are both in a collapsed orientation (e.g., parallel to the direction of travel). Preferably, the left segment 142 and the right segment 144 swing forwardly (relative to a direction of travel) and extend along the tank 112.

Figure 3:
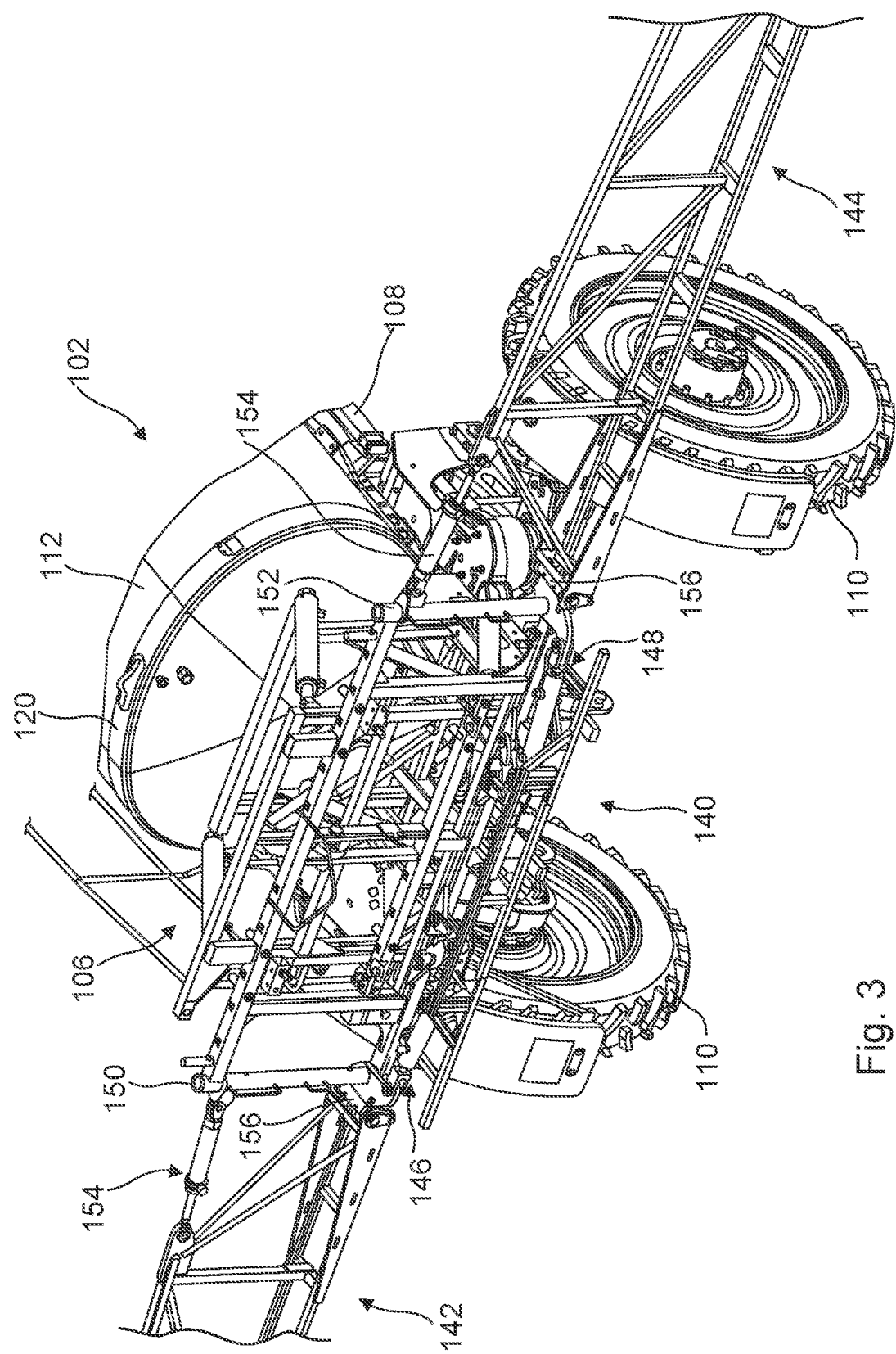
FIG. 3 is a detailed perspective view of the agricultural sprayer of FIG. 1, illustrating a boom-positioning mechanism, shown from a rear side with the boom in the raised position.
Figure 4:
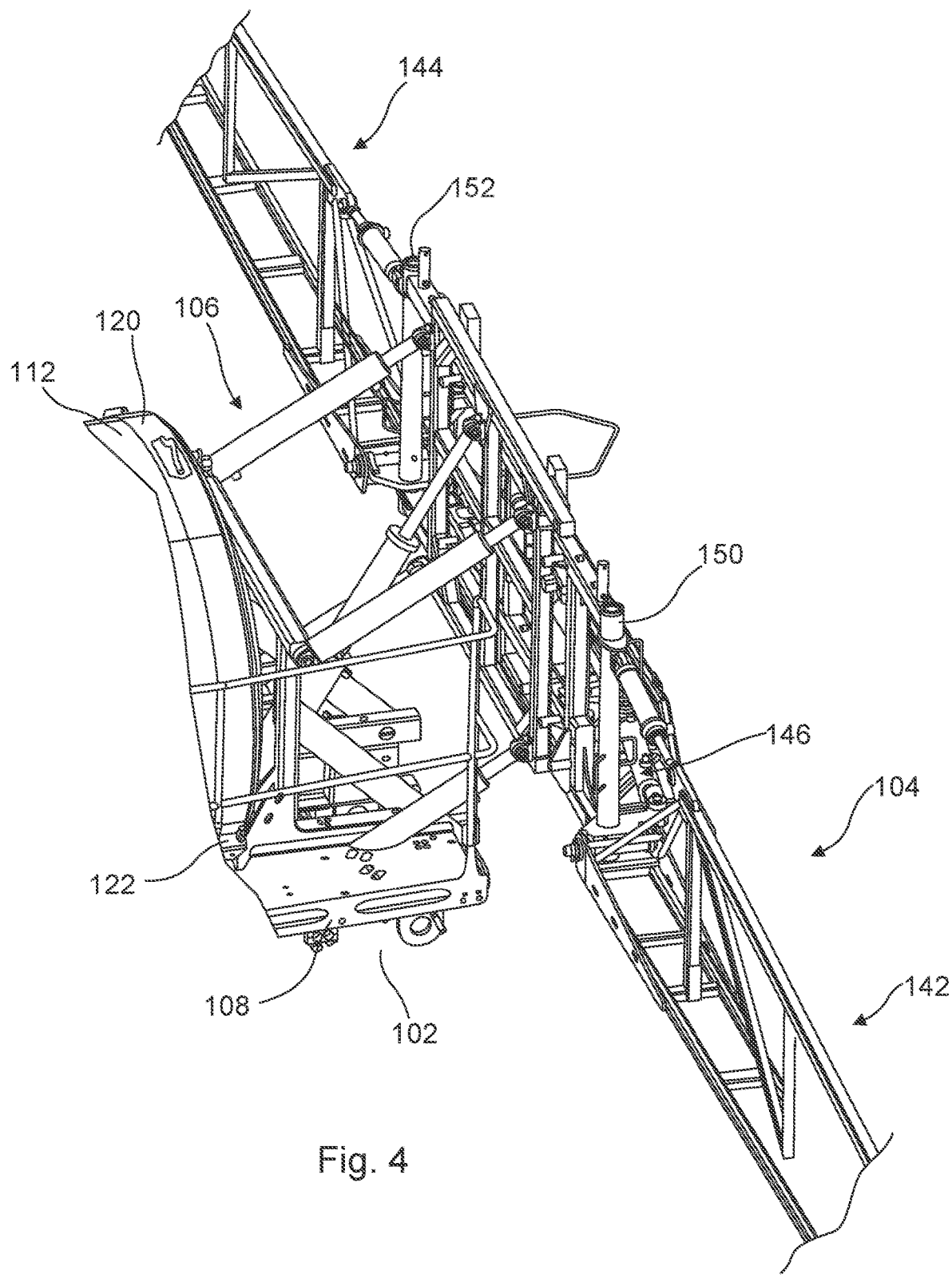
FIG. 4 is a detailed perspective view of the agricultural sprayer of FIG. 1, shown from a left side.

In some embodiments, the boom 104 is disposed generally at a rear side of the mobile frame 102, as illustrated in FIGS. 1 and 2. In these embodiments, the central segment 140 may be directly secured to the rear side of the mobile frame 102 via the boom-positioning mechanism 106, as best illustrated in FIGS. 3 and 4, with the left segment 142 and the right segment 144 extending laterally from the central segment 140. In other embodiments, the boom may be disposed generally at a front side of the mobile frame. In these embodiments, the central segment may be secured directly to the front side of the mobile frame via the boom-positioning mechanism 106, with the left segment and the right segment extending laterally from the central segment. In still other embodiments, the boom is disposed alongside the mobile frame between the rear side and the front side. In these embodiments, there may be no central segment. Instead, the left segment and the right segment may be secured directly to the mobile frame. In these embodiments, the left segment and the right segment may each have an associated and independent boom-positioning mechanism.

In some embodiments, and as shown in FIGS. 3 and 4, the boom 104 may include a left deployment actuator 146 and a right deployment actuator 148. The left deployment actuator 146 is disposed between the central segment 140 and the left segment 142. The right deployment actuator 148 is disposed between the central segment 140 and the right segment 144. The left deployment actuator 146 swings the left segment 142 laterally about a left pivot 150. The right deployment actuator 148 swings the left segment 142 laterally about a right pivot 152. In the deployed position, the left segment 142 and the right segment 144 are both aligned with the central segment 140 to form a generally straight boom 104 that is perpendicular to the fore-and-aft axis. In the stowed position, the left segment 142 and the right segment 144 are both perpendicular to the central segment 140, to form a general U-shape of the boom 104 when viewed from above.

In some embodiments, the boom 104 may include vertical deployment actuators 154 and vertical pivots 156, as best shown in FIG. 3. Thus, the left segment 142 and the right segment 144 may be angularly positioned about a fore-and-aft axis, by swinging up and down about the respective fore-and-aft axes defined by the vertical pivots 156.

The boom 104 includes or is otherwise associated with the set of spray mechanisms 114, each configured to apply the spray material from the tank 112. Each of the spray mechanisms 114 is fluidly coupled to the tank 112. In some embodiments, the fluid connection may be via a hose, plumbing, or other fluid passageway. The spray mechanisms 114 expel the spray material. In embodiments, the mobile frame 102 may include agitators and/or re-circulators for moving the spray material through the boom 104, the plumbing, and any filters. This reduces the likelihood of settling or clogging of the spray material, especially during times that the agricultural sprayer 100 is not dispensing the spray material.

Exemplary Boom-Positioning Mechanisms

The boom-positioning mechanism 106 is configured to support the boom 104 on the mobile frame 102 for selective movement between a raised boom position (shown in FIGS. 1 and 3-5) and a lowered boom position (shown in FIGS. 2 and 6), and which may include intermediate boom positions between the raised boom position and the lowered boom position. The raised boom position and the lowered boom position set the vertical height of the boom 104 relative to the mobile frame 102, to an underlying surface (e.g., the ground) upon which the mobile frame 102 is moving. The vertical height of the boom 104 relative to the underlying surface typically affects spray characteristics. Thus, the user may desire to have the spray mechanisms 114 disposed a certain distance above an average crop height, a certain distance above a measured crop height (as measured via a sensor, discussed below), or a certain distance above the ground level. The user (and/or a controller, discussed below) may position the boom-positioning mechanism 106 such that the boom 104 is at the selected height. The boom 104 may remain at the selected height as the mobile frame 102 moves over the area and sprays the spray materials via the spray mechanisms 114.

The boom-positioning mechanism 106 provides a constant (or substantially constant) horizontal spacing between the boom 104 and the mobile frame 102 in the raised boom position and the lowered boom position (and at intermediate boom positions). As most clearly shown in FIGS. 5 and 6, the boom-positioning mechanism 106 allows the boom 104 (omitted from these figures) to move directly up and down between the raised and lowered positions. Because the boom 104 moves directly up and down, the boom-positioning mechanism 106 keeps a constant weight distribution of the boom 104 relative to the mobile frame 102, as discussed above.

Figure 5:
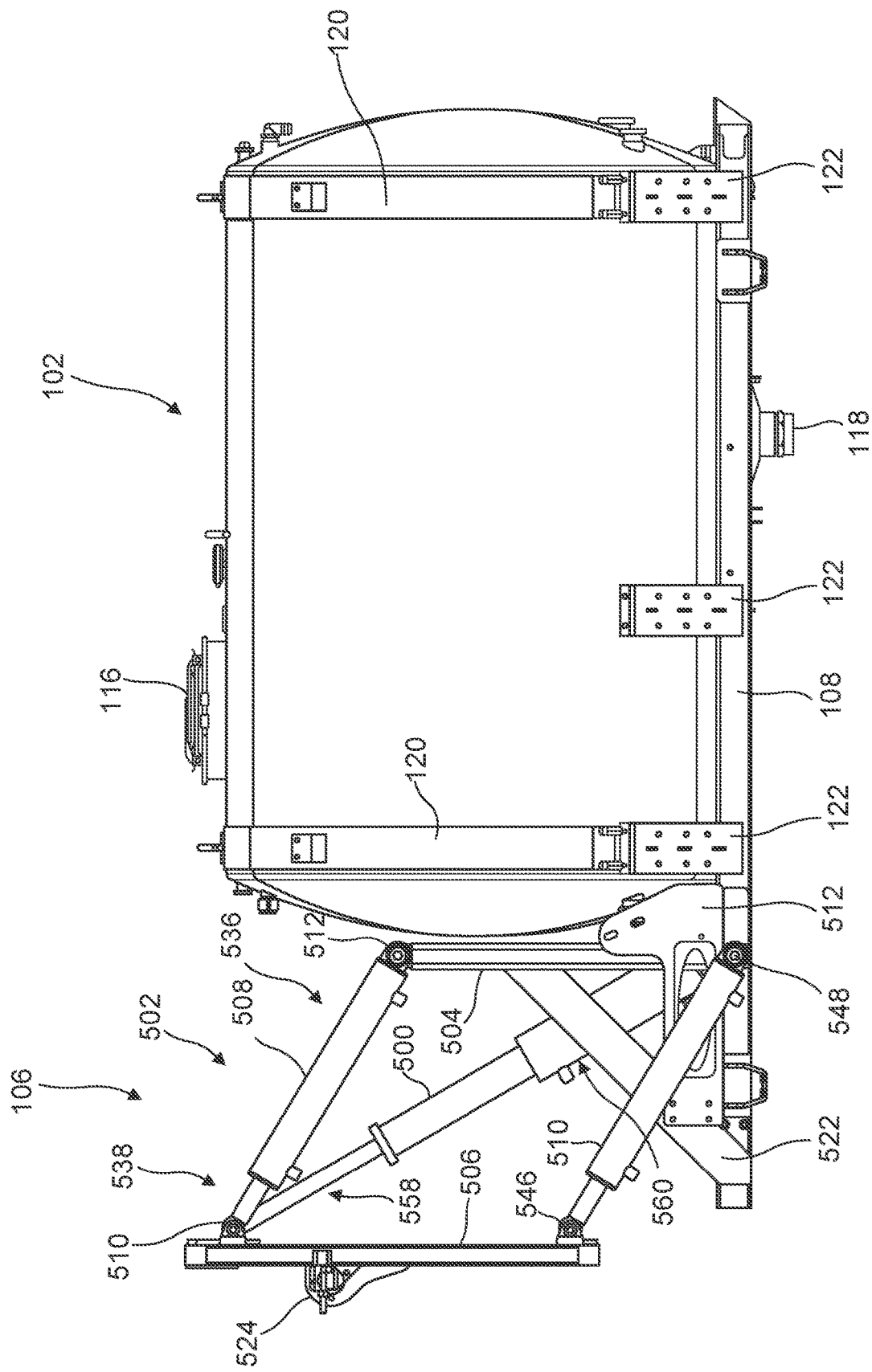
FIG. 5 is a side view of a portion of the agricultural sprayer of FIG. 1 in the raised boom position, omitting the boom, wheels, and other parts to clearly show the boom-positioning mechanism.
Figure 6:
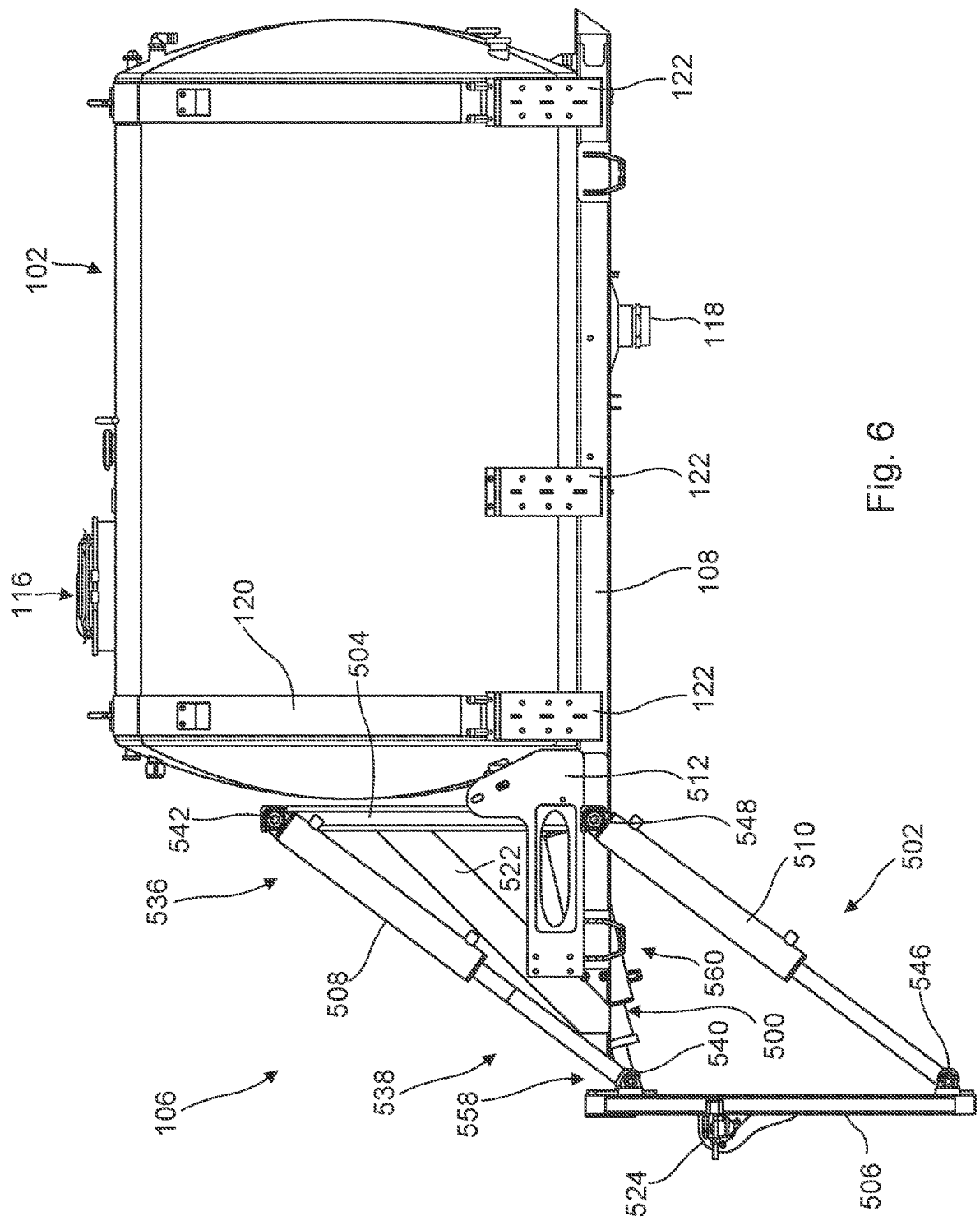
FIG. 6 is a side view of a portion of the agricultural sprayer of FIG. 1, similar to FIG. 5, but depicting the boom in the lowered boom position.
Figure 7:
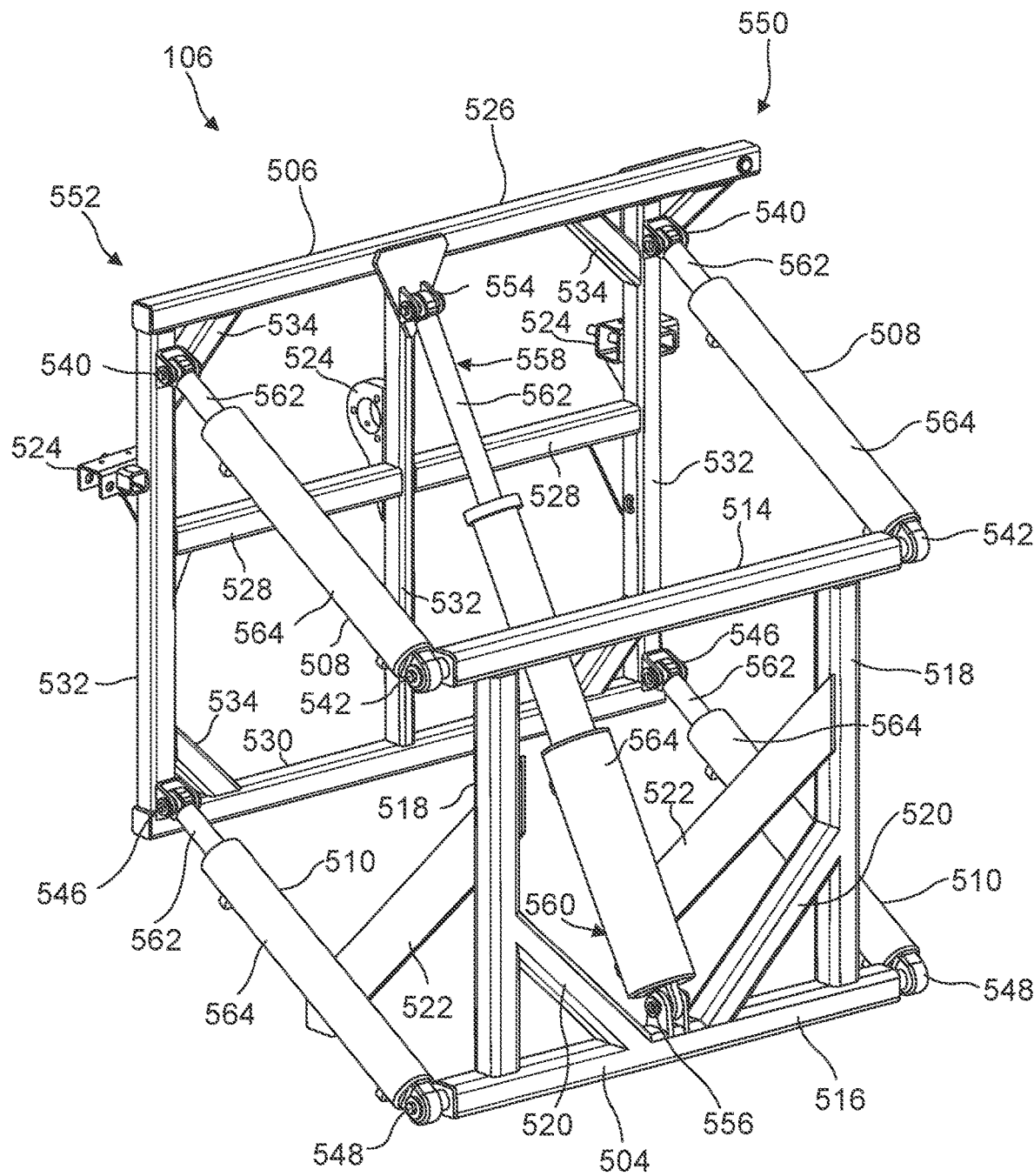
FIG. 7 is a perspective view of a boom-positioning mechanism, having a positioning actuator that is centralized and angled.

The boom-positioning mechanism 106 is shown in more detail in FIGS. 5-7. The boom-positioning mechanism 106 includes a positioning actuator 500 and a telescoping parallel linkage 502. The positioning actuator 500 and the telescoping parallel linkage 502 work together to move the boom 104 between the raised boom position and the lowered boom position while maintaining constant horizontal spacing between the boom 104 and the mobile frame 102. The positioning actuator 500 is configured to place the boom 104 in the raised boom configuration upon elongation and in the lowered boom position upon retraction. The telescoping parallel linkage 502 provides constant spacing between the boom 104 and the mobile frame 102 in the raised boom position and the lowered boom position. In certain embodiments, the telescoping parallel linkage 502 moves counter to the positioning actuator 500 to maintain the constant spacing. Thus, the telescoping parallel linkage 502 may retract while the positioning actuator 500 is elongated, and the telescoping parallel linkage 502 may lengthen while the positioning actuator 500 retracts. This counter motion may be controlled by the controller, as discussed below.

One embodiment of the telescoping parallel linkage 502 is most clearly shown in FIG. 7. The telescoping parallel linkage 502 of this embodiment includes a first vertical link 504, a second vertical link 506, a pair of top pivot links 508, and a pair of bottom pivot links 510. The first vertical link 504 and the second vertical link 506 each have a fixed length. The first vertical link 504 is secured to the mobile frame 102 (as shown in FIGS. 5 and 6). The second vertical link 506 is secured to the boom 104 (as shown in FIGS. 3 and 4).

In some embodiments, the first vertical link 504 is configured to be secured to a frame-mounting bracket 512 (as illustrated in FIGS. 5 and 6). The frame-mounting bracket 512 is secured to the chassis 108 of the mobile frame 102, such as in proximity to the tank 112 as illustrated in FIGS. 3-6. The frame-mounting bracket 512 keeps the first vertical link 504 aligned vertically and secure in relation to the mobile frame 102. As best shown in FIG. 7, the first vertical link 504 may include an upper rung 514, a lower rung 516, and two vertical posts 518. The two vertical posts 518 are disposed between and connect the upper rung 514 and the lower rung 516. The first vertical link 504 may further include internal support arms 520 disposed diagonally between the two vertical posts 518 and the lower rung 516. The first vertical link 504 may further include external support plates 522 disposed between the two vertical posts 518 (as best shown in FIG. 7) and the chassis 108 (as best shown in FIGS. 5 and 6).

In some embodiments, the second vertical link 506 is configured to be secured to the boom 104 (as illustrated in FIGS. 3 and 4) at a boom mount 524. The boom mount 524 is secured to the boom 104, along with hydraulic lines and plumbing lines for carrying the spray material. The second vertical link 506 may include an upper rung 526, a central rung 528, a lower rung 530, and vertical posts 532 (three shown in FIG. 7). The vertical posts 532 are disposed between and connect the upper rung 526 and the lower rung 530. The central rung 528 is secured to the vertical posts 532. The second vertical link 506 may further include internal support arms 534 disposed diagonally between the two exterior vertical posts 532 and the lower rung 530, as well as between the two exterior vertical posts 532 and the upper rung 526.

The pair of top pivot links 508 and the pair of bottom pivot links 510 are each selectively extendable between a retracted position (shown in FIG. 5) and an extended position (shown in FIG. 6). The pivot links 508, 510 change angle relative to the first vertical link 504 and the second vertical link 506 in response to movement of the positioning actuator 500 (discussed below). The pivot links 508, 510 have a frame end 536 and a boom end 538 (shown in FIGS. 5 and 6). As shown in FIG. 7, the set of pivot links may include four pivot links 508, 510 (the pair of top pivot links 508, disposed to the left and right, and the pair of bottom pivot links 510, also disposed to the left and right).

Each top pivot link 508 is associated with an upper boom-side pivot 540 and an upper frame-side pivot 542. Each bottom pivot link 510 is associated with a lower boom-side pivot 546 and a lower frame-side pivot 548. The pivots enable free pivoting of the pivot links, thus forming the parallel linkage. The pivot links 508, 510 also elongate and retract, thus forming the telescoping parallel linkage 502. In some embodiments, each of the pivot links 508, 510 are kept at the same length as the other pivot links 508, 510. If the pivot links 508, 510 have the same length, the second vertical link 506 remains in a vertical orientation (i.e., parallel to the first vertical link 504) regardless of the angle of the pivot links 508, 510 relative to the first vertical link 504.

Returning to FIGS. 5 and 6, the telescoping parallel linkage 502 and the positioning actuator 500 are illustrated. FIGS. 5 and 6 show the telescoping parallel linkage 502 from a side view such that only one of two parallel linkages is visible. This is done to simplify the view, such that the lateral spacing can be seen. The two parallel linkages are best illustrated in FIG. 7. Some embodiments may include the two parallel linkages, being vertically parallel to one another as shown in FIG. 7, and others may include a single parallel linkage.

The telescoping parallel linkage 502 is a four-bar linkage. The four components of the four-bar linkage are the first vertical link 504, the top pivot link 508, the second vertical link 506, and the bottom pivot link 510. As shown in FIG. 7, the telescoping parallel linkage 502 may include a left parallel linkage 550 and a right parallel linkage 552. In some of these embodiments, the positioning actuator 500 being disposed between the left parallel linkage 550 and the right parallel linkage 552. The left parallel linkage 550 includes a top pivot link 508, a bottom pivot link 510, a vertical post 518 of the first vertical link 504, and a vertical post 532 of the second vertical link 506. The right parallel linkage 552 includes a top pivot link 508, a bottom pivot link 510, a vertical post 518 of the first vertical link 504, and a vertical post 532 of the second vertical link 506.

The positioning actuator 500 is disposed between the boom 104 and the mobile frame 102 such that the positioning actuator 500 may set the position of the boom 104 relative to the mobile frame 102. The positioning actuator 500 is configured to elongate to raise the boom 104 to the raised boom position and to retract to lower the boom 104 to the lowered boom position. The positioning actuator 500 is pivotably secured between the boom 104 at a boom-side pivot 554 and the mobile frame 102 at a frame-side pivot 556 (shown in FIG. 7), such that the positioning actuator 500 changes an angle relative to the mobile frame 102 when in the raised boom position and the lowered boom position (compare FIG. 5 to FIG. 6). In some embodiments, the positioning actuator 500 is secured to the first vertical link 504 and the second vertical link 506. As illustrated in FIG. 7, the positioning actuator 500 may be secured to the first vertical link 504 at the upper rung 514 and to the second vertical link 506 at the lower rung 530. In other embodiments, the positioning actuator 500 may be secured directly to the boom 104 and/or the mobile frame 102 (such as at the chassis 108).

The positioning actuator 500 has a boom end 558 opposite a frame end 560. In embodiments, the boom end of the positioning actuator 500 is disposed proximate the top pivot links 508 of the left and right parallel linkages 550, 552. The mobile frame 102 end of the positioning actuator 500 is disposed proximate the bottom pivot links 510 of the left and right parallel linkages 550, 552. The positioning actuator 500 is pivotably secured proximate to the upper boom-side pivot 540 and pivotably secured proximate to the lower frame-side pivot 548.

As best shown in FIG. 5, the top pivot link 508 and the bottom pivot link 510 are in the retracted position when the positioning actuator 500 is elongated and the boom 104 is in the raised position. As best shown in FIG. 6, the top pivot link 508 and the bottom pivot link 510 are in the extended position when the positioning actuator 500 is retracted and the boom 104 is in the lowered position.

The positioning actuator 500 and the telescoping parallel linkage 502 may include one or more hydraulic cylinders. The hydraulic cylinders may include a piston 562 and a tube 564. The positioning actuator 500 may further include an intermediate segment 566. The piston 562 (and/or the intermediate segment 566) moves relative to the tube 564 based upon hydraulic fluid being forced into the tube 564. In some embodiments, the hydraulic cylinders (of the positioning actuator 500 and/or the telescoping parallel linkage 502) are double-acting cylinders. Double-acting cylinders can be forced to elongate and retract based upon which side of the piston 562 the hydraulic fluid is forced. In some embodiments, each hydraulic cylinder of a set of double-acting hydraulic cylinders of the parallel linkage corresponds with a pivot link of the set of pivot links 508, 510. In some embodiments, all five hydraulic cylinders (e.g., the positioning actuator 500 and the four pivot links 508, 510 of the telescoping parallel linkage 502 of the embodiment shown in FIG. 7) are double-acting hydraulic cylinders. In other embodiments, only the positioning actuator 500 is a double-acting hydraulic cylinder and the four pivot links 508, 510 are single-acting cylinders, or some other combination thereof.

Figure 8:
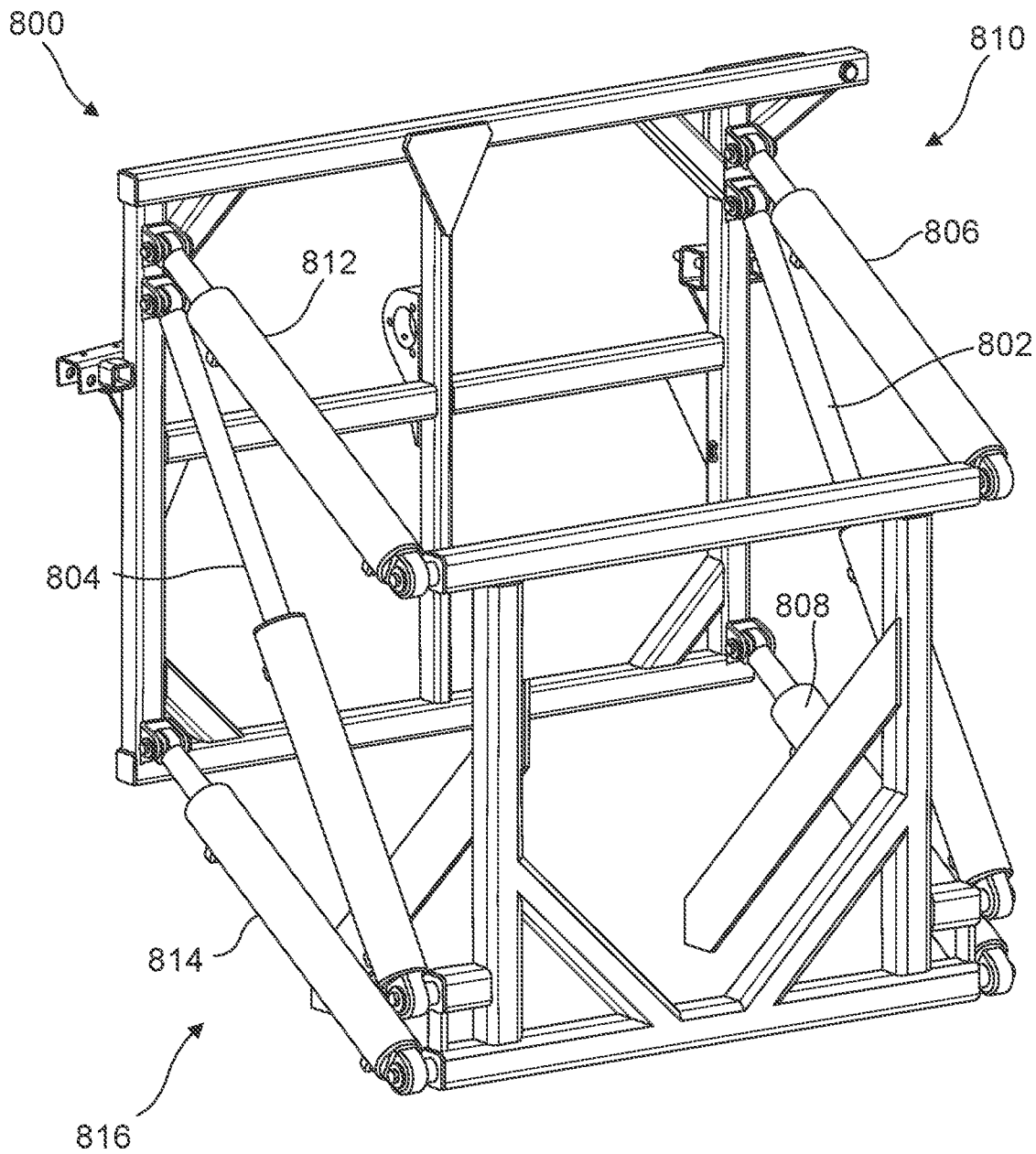
FIG. 8 is a perspective view of another boom-positioning mechanism, having two positioning actuators that are spaced apart and angled.

FIG. 8 shows another embodiment of a boom-positioning mechanism 800. The boom-positioning mechanism 800 includes a left positioning actuator 802 and a right positioning actuator 804. The left positioning actuator 802 is disposed between the top pivot link 806 and the bottom pivot link 808 of the left parallel linkage 810. The right positioning actuator 802 is disposed between the top pivot link 812 and the bottom pivot link 814 of the right parallel linkage 816. This is as opposed to the single, centralized positioning actuator 500 of the embodiment in FIG. 7.

Figure 9:
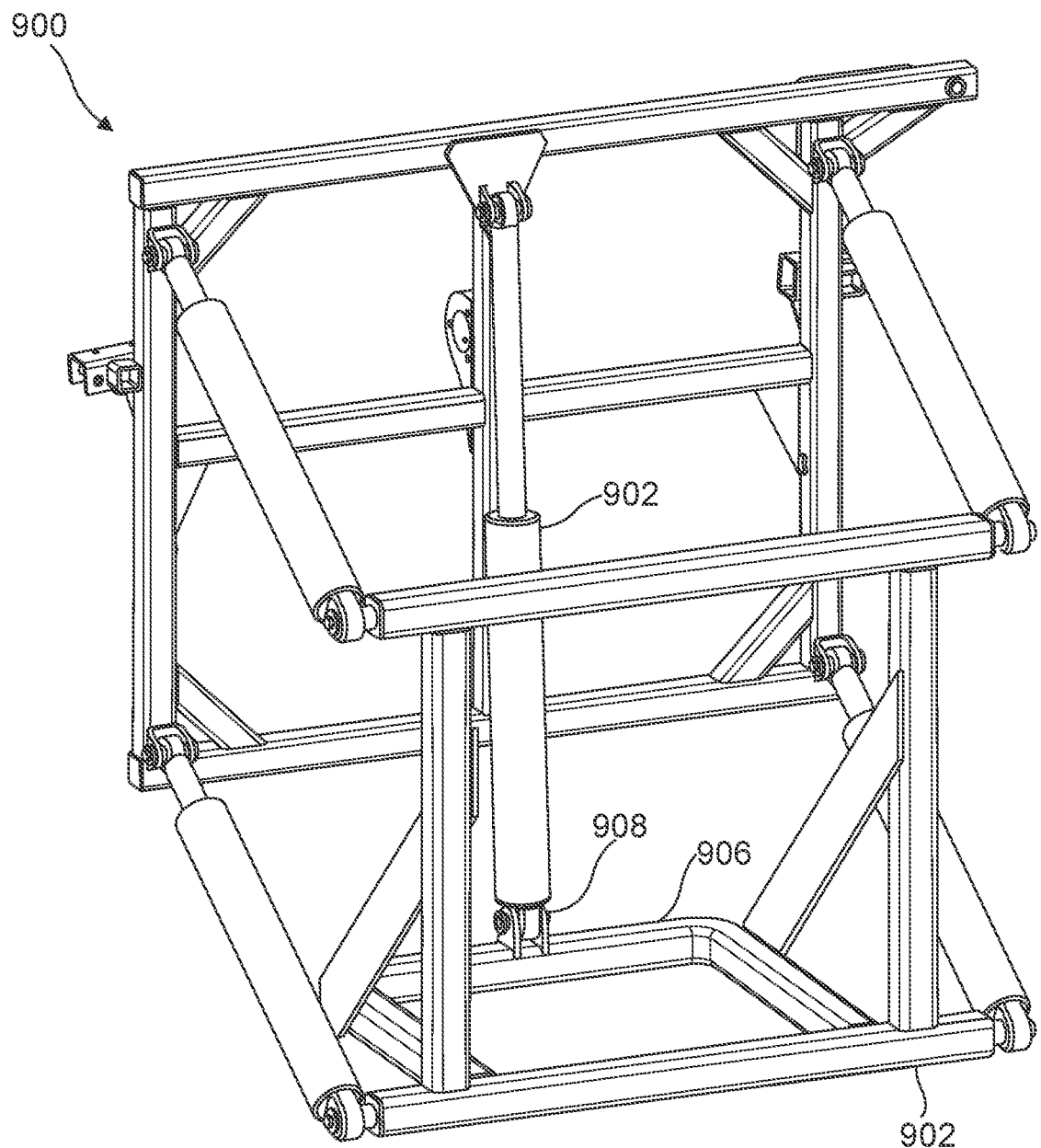
FIG. 9 is a perspective view of a third boom-positioning mechanism, having a positioning actuator that is centralized and more vertical than the positioning actuator shown in FIG. 7.

FIG. 9 shows another embodiment of a boom-positioning mechanism 900. The boom-positioning mechanism 900 includes a single positioning actuator 902 that is disposed at a more vertical angle than the embodiment shown in FIG. 7. The second vertical link 904 includes a positioning actuator base 906. The positioning actuator base 906 provides a pivot 908 for the positioning actuator 902 that is laterally nearer to the boom 104 (FIG. 1). This may increase the lifting power of the positioning actuator 902.

Exemplary Control Steps

Figure 10:
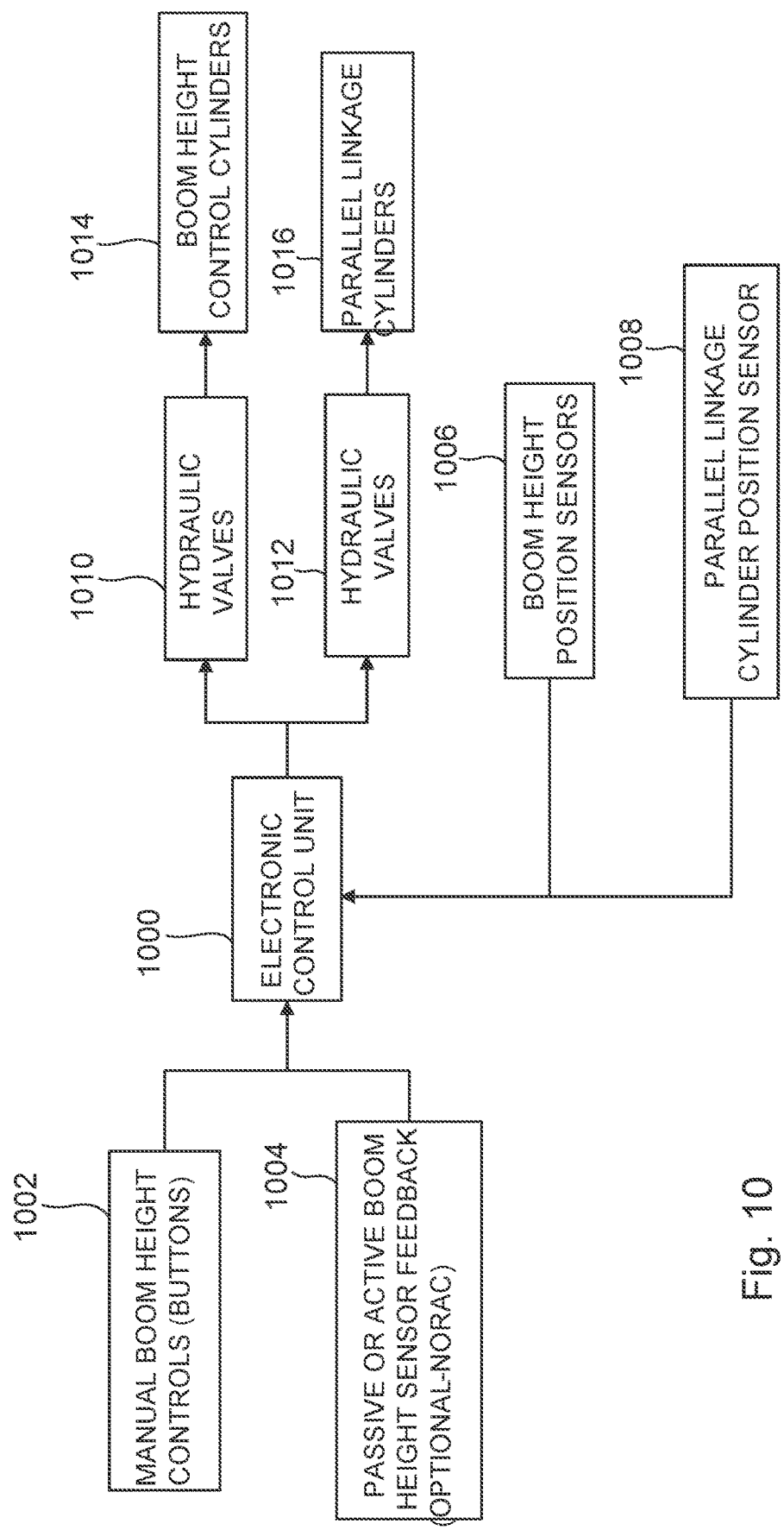
FIG. 10 is a simplified schematic diagram showing hardware components associated with a controller.

FIG. 10 shows a schematic diagram of a controller. The controller is an electronic control unit 1000. The electronic control unit 1000 receives various inputs and/or commands and controls the operation of the boom-positioning mechanism 106 (and may control other functions of the mobile frame 102 and/or tractor 124, such as the driving and the spraying of the spray material). The electronic control unit 1000 may monitor the status and setting of various systems, such as the boom height.

The electronic control unit 1000 may receive manual boom height controls 1002 that instruct the electronic control unit 1000 as to the height of the boom 104 as desired by the operator. The electronic control unit 1000 may also receive passive or active boom height sensor feedback 1004. This is indicative of the height of the boom 104 relative to the height of the crops. The electronic control unit 1000 may also receive input from boom height positioning sensors indicative of the boom height relative to the mobile frame 102. For example, these may be positioning sensors from the positioning actuator 500. The electronic control unit 100 may also receive input from parallel linkage cylinder position sensors. These may be indicative of the amount of elongation of the set of pivot links.

Thus, the controller is configured to receive user input indicative of a target height for the boom 104. The target height may be relative to crop height level and/or relative to ground level. The target height may be specified by the user, based upon an amount of coverage desired. In other embodiments, the user may specify the spray material being used, and the controller determines the appropriate target height based upon the spray material being used, the desired effects, characteristics of the crops, etc.

Based upon the above discussed inputs, the electronic control unit 1000 may determine that a change in the boom height is needed. The electronic control unit 100 may send an instruction to a first set of hydraulic valves 1010 and/or a second set of hydraulic valves 1012. The first set of hydraulic valves 1010 is associated with the boom height control cylinder (e.g., the positioning actuator 500). The second set of hydraulic valves 1012 is associated with the parallel linkage cylinders (e.g., the top pivot links 508 and the bottom pivot links 510). Thus, the controller is configured to selectively manipulate the positioning actuator 500 and the telescoping parallel linkage 502. In some embodiments, the controller is configured to shorten the telescoping parallel linkage 502 upon elongating the positioning actuator 500 to maintain a constant spacing between the boom 104 and the mobile frame 102 as the boom 104 raises from the lowered boom position. The controller is also configured to elongate the telescoping parallel linkage 502 upon retracting the positioning actuator 500 to provide the constant spacing between the boom 104 and the mobile frame 102 as the boom 104 lowers relative to the raised boom position. It should be appreciated that this inverse movement is also applicable to movement among any intermediate positions between the raised boom position and the lowered boom position.

In some embodiments, the controller is configured to operate the first set of hydraulic valves inversely proportional to the second set of hydraulic valves to maintain a constant spacing of the boom 104 relative to the frame 102. The first set of hydraulic valves and the second set of hydraulic valves can each have any number (which can include one) of hydraulic actuators associated therewith, based upon the various configurations of actuators. In some embodiments, the controller is configured to retract the top pivot link 508 and the bottom pivot link 510 while elongating the positioning actuator 500 to provide constant spacing between the boom 104 and the mobile frame 102 as the boom 104 is raised.

Some embodiments include a computerized method of controlling the first set of hydraulic valves and the second set of hydraulic valves to achieve the set boom height while keeping the same lateral spacing when moving to the set height. The method may include determining a current height of the boom 104, determining (based upon input or calculation) a set height for the boom 104, operating the first set of hydraulic valves and the second set of hydraulic valves such that the boom 104 moves to the set height while remaining at a constant lateral spacing relative to the mobile frame 102. The computerized method may further include receiving user input indicative of a target height for the boom 104. The computerized method may further include operating the first hydraulic valve inversely proportional to the second hydraulic valve to keep the constant spacing; the inverse proportionality being related to the positioning actuator 500 traveling further between the raised boom position and the lowered boom position than the telescoping parallel linkage 502 travels between these positions.

Still other embodiments may include a non-transitory computer readable storage medium having a computer program stored thereon, wherein the computer program instructs the controller (or other processing element(s)) to perform the method discussed above.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claim(s) set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements shall apply unless so stated in this description and/or except as will be readily apparent to those skilled in the art from the description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

I claim:

1. A sprayer vehicle, comprising:
   a mobile frame;
   a tank carried by the mobile frame and configured to store a spray material;
   a boom spaced from the frame; and
   a boom-positioning mechanism configured to support the boom on the frame for selective movement between a raised boom position and a lowered boom position, the boom-positioning mechanism comprising:
      a positioning actuator, and
      a telescoping parallel linkage comprising a top pivot link and a bottom pivot link, the telescoping parallel linkage configured to maintain a constant lateral spacing between the boom and the frame in the raised boom position and the lowered boom position;
      wherein the top pivot link and the bottom pivot link are each selectively extendable between a retracted position and an extended position;
   wherein the top pivot link is pivotally connected to each of an upper boom-side pivot and an upper frame-side pivot;
   wherein the bottom pivot link is pivotally connected to each of a lower boom-side pivot and a lower frame-side pivot; and
   wherein the positioning actuator is pivotally connected to the upper boom-side pivot and the lower frame-side pivot.

2. The sprayer vehicle of claim 1, further comprising:
   a motor supported on the mobile frame and configured to propel the mobile frame; and
   a cab supported on the mobile frame and configured to support a driver.

3. The sprayer vehicle of claim 1, wherein the telescoping parallel linkage comprises a first vertical link secured to the mobile frame and a second vertical link secured to the boom.

4. The sprayer vehicle of claim 1, wherein the positioning actuator is configured to raise the boom to the raised boom position upon elongation and to lower the boom to the lowered boom position upon retraction, and wherein top pivot link and the bottom pivot link are in the retracted position when the boom is in the raised boom position.

5. The sprayer vehicle of claim 1, further comprising a second telescoping parallel linkage, wherein the positioning actuator is between the telescoping parallel linkage and the second telescoping parallel linkage.

6. The sprayer vehicle of claim 1, further comprising: a controller configured to selectively manipulate the positioning actuator and the telescoping parallel linkage, wherein the controller is configured to shorten the telescoping parallel linkage upon elongating the positioning actuator to maintain the constant spacing between the boom and the frame between the raised boom position and the lowered boom position.

7. The sprayer vehicle of claim 6, wherein the controller is configured to receive user input indicative of a target height of the boom.

8. The sprayer vehicle of claim 6, further comprising a height sensor configured to measure a height of the boom, the controller communicatively coupled with the height sensor.

9. The sprayer vehicle of claim 6, wherein the positioning actuator and the telescoping parallel linkage each comprise hydraulic cylinders, the controller is configured to operate a first hydraulic valve associated with the positioning actuator, and the controller is configured to operate a second hydraulic valve associated with the telescoping parallel linkage.

10. The sprayer vehicle of claim 9, wherein the hydraulic cylinder of the positioning actuator comprises a double-acting cylinder, the hydraulic cylinder of the telescoping parallel linkage comprises a set of double-acting hydraulic cylinders, and each hydraulic cylinder of the set of double-acting hydraulic cylinders of the telescoping parallel linkage corresponds with one of the top pivot link and the bottom pivot link.

11. The sprayer vehicle of claim 10, wherein the set of double-acting hydraulic cylinders comprises four double-acting hydraulic cylinders.

12. The sprayer vehicle of claim 9, wherein the controller is configured to operate the first hydraulic valve inversely proportional to the second hydraulic valve to maintain the constant spacing.

13. The sprayer vehicle of claim 6, wherein the controller is configured to retract the top pivot link and the bottom pivot link while elongating the positioning actuator to provide the constant spacing between the boom and the frame as the boom is raised.

14. The sprayer vehicle of claim 1, further comprising a second telescoping parallel linkage and a second positioning actuator.

15. A method of positioning a boom of the sprayer vehicle of claim 1, the method comprising:
   moving the boom between the raised boom position and the lowered boom position by adjusting a length of the positioning actuator and simultaneously adjusting a length of the telescoping parallel linkage, such that a lateral spacing between the boom and the frame remains constant.

16. The method of claim 15, further comprising maintaining an orientation of a vertical link carrying the boom parallel to a vertical link carried by the mobile frame while moving the boom.

17. The method of claim 15, further comprising receiving an indication of a boom height, and moving the boom responsive to the indication of the boom height.

18. The method of claim 15, wherein adjusting the length of the positioning actuator comprises adjusting a length of each of a pair of parallel positioning actuators.

\* \* \* \* \*